(12) United States Patent
Hageman et al.

(10) Patent No.: US 6,250,432 B1
(45) Date of Patent: Jun. 26, 2001

(54) WHEEL CHOCKING DEVICE AND METHOD FOR USING THE SAME

(75) Inventors: Martin P. Hageman, Mequon; Thomas J. Palus, Franklin, both of WI (US); Charles H. Hodges, Ruxton, MD (US); Jack L. Sherard, Whitefish Bay, WI (US)

(73) Assignee: Kelley Company, Inc., Mequon, WI (US)

( * ) Notice: Subject to any disclaimer, the term of this patent is extended or adjusted under 35 U.S.C. 154(b) by 0 days.

(21) Appl. No.: 09/214,408

(22) PCT Filed: Jun. 25, 1997

(86) PCT No.: PCT/US97/11081

§ 371 Date: Jun. 29, 1999

§ 102(e) Date: Jun. 29, 1999

(87) PCT Pub. No.: WO97/49626

PCT Pub. Date: Dec. 31, 1997

Related U.S. Application Data

(60) Provisional application No. 60/020,686, filed on Jun. 27, 1996.

(51) Int. Cl.$^7$ ................................ B60T 3/00; B65F 9/00
(52) U.S. Cl. ............................................. 188/32; 414/401
(58) Field of Search ..................... 188/4 R, 32; 414/401, 414/396

(56) References Cited

U.S. PATENT DOCUMENTS

| | | |
|---|---|---|
| 1,102,773 | 7/1914 | Martin . |
| 3,110,466 | 11/1963 | O'Sullivan ............................ 248/119 |
| 3,305,049 | 2/1967 | Willey ................................... 188/32 |
| 4,207,019 | 6/1980 | Cone ..................................... 414/373 |
| 4,216,724 | 8/1980 | Grillet ................................... 104/258 |
| 5,531,557 | * 7/1996 | Springer ................................ 414/401 |
| 5,553,987 | 9/1996 | Ellis ...................................... 414/401 |
| 5,582,498 | 12/1996 | Springer et al. ....................... 414/401 |
| 5,709,518 | 1/1998 | Alexander et al. ................... 414/401 |
| 5,762,459 | * 6/1998 | Springer et al. ...................... 414/401 |

FOREIGN PATENT DOCUMENTS

| | | | |
|---|---|---|---|
| 583404 | 2/1933 | (DE) . | |
| 537074A1 | 5/1993 | (EP) | ............................. B65G/67/02 |
| 91 12448 | 4/1963 | (FR) | ............................... B60T/3/00 |
| 526008 | 2/1958 | (IT) . | |
| WO95/18029 | 7/1995 | (WO) | ............................. B60T/1/14 |

OTHER PUBLICATIONS

"Equipements Servoqual" brochure published by Michel Roux starting in March, 1991 or earlier, and translation
"Les Hommes, Les Vehicules, Le Quai" Brochure published by Michel Roux starting in Nov. 1991 or earlierr, and translation.

(List continued on next page.)

Primary Examiner—Christopher P. Schwartz
(74) Attorney, Agent, or Firm—Michael Best & Friedrich LLP

(57) ABSTRACT

A method of securing a vehicle at a desired location using a wheel chocking device (30) having a chock (38) movable between a lowered position and a raised position. The method comprises the steps of positioning the vehicle at the desired location with the chock (38) in the lowered position, raising the chock to the raised position, moving the raised chock toward a wheel of the vehicle, sensing the presence of an obstruction on the vehicle, lowering the raised chock to an intermediate position to allow the chock to pass under the obstruction, and contacting the chock with the wheel. The wheel chocking device (30) includes a drive mechanism (40) that is positioned underneath the chock so that the vehicle actually drives over the drive mechanism. The drive mechanism is simplified with the use of a drive screw (152) and a partial drive nut (148, 154) that facilitates the use of support members (156) for supporting the drive screw at spaced locations along the length of the drive screw. A multi-link chock facilitates use of the device on wheels of varying sizes.

34 Claims, 13 Drawing Sheets

OTHER PUBLICATIONS

Photographs published by Michel Roux in 1991.

"Descriptif Technique, Descriptif de Fonctionnement, & Caracteristiques Techniques" brochure published by Michel Roux starting in Oct., 1991 or earlierr, and translation.

"Amenagement de Quais Industriels" brochure published by Michel Roux starting in Nov., 1991 or earlierr, and translation.

"Calage Automatiqe" brochure published collectively with the "Amenagement de Quals Industriels" brochure by Michel Roux starting in Mar. 1992 or earlier, and translation.

* cited by examiner

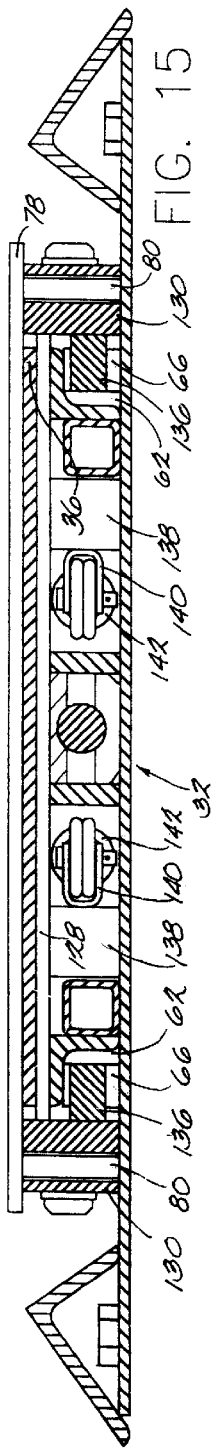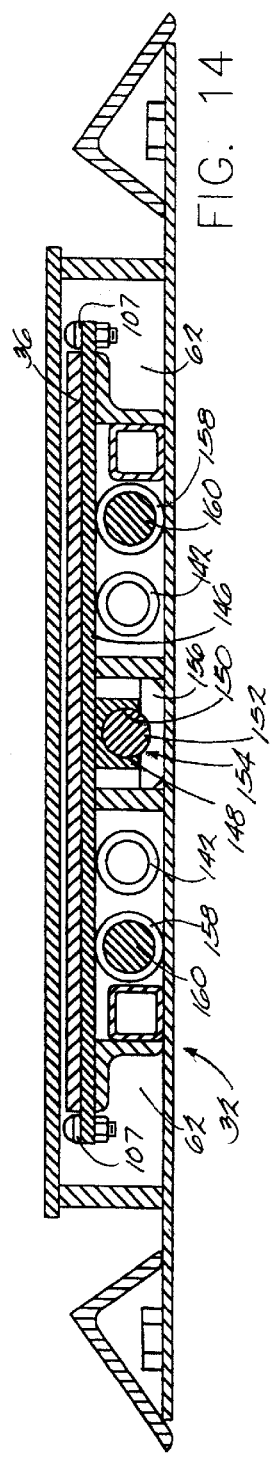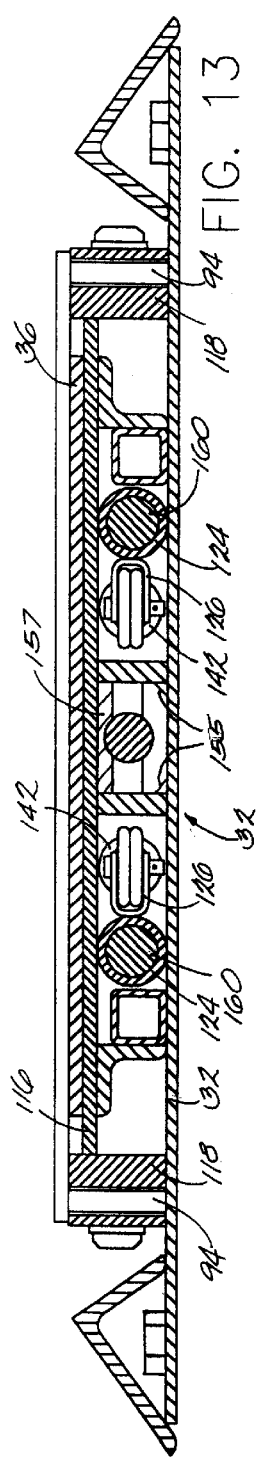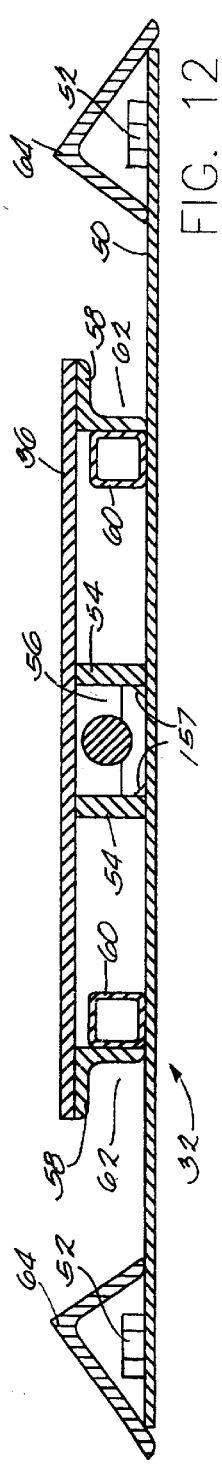

WHEEL CHOCKING DEVICE AND METHOD FOR USING THE SAME

This application is a 371 of PCT/US97/11081 filed Jun. 25, 1997 and also claims benefit of Provisional No. 60/020,686 filed Jun. 27, 1996.

FIELD OF THE INVENTION

The present invention generally relates to the field of vehicle restraining devices that prevent movement of a vehicle away from a desired location. More specifically, the present invention relates to powered wheel chocking devices.

BACKGROUND OF THE INVENTION

Powered wheel chocking devices have been developed to allow a vehicle (e.g., a straight truck, a trailer with or without a tractor, etc.) to be secured at a desired location (e.g., a loading dock) so that loading, unloading or other operations can be performed without risk that the vehicle will unexpectedly move away. Such wheel chocking devices typically include a chock that can be selectively moved by a drive mechanism between a chocked position and an unchocked position. These devices are commonly provided with visual and audible signals that indicate when the chock is in the chocked position and when the chock is in a unchecked position.

One type of powered wheel chocking device has been designed by Michel Roux, and is disclosed in European Patent Publication No. 537,075. The Roux device includes a chock that is movable between an unchecked lowered position and chocked raised position. The Roux device is designed to maintain the chock in a lowered position until the chock has been moved longitudinally into contact with the vehicle wheel. After contact with the vehicle wheel, further movement of the drive mechanism causes the chock to pivot to the raised position to secure the vehicle wheel.

A similar device is disclosed in U.S. Pat. No. 5,375,965 to Springer et al. The Springer device also includes a chock that is movable between lowered and raised positions, and the chock is designed to be moved longitudinally into contact with the vehicle wheel while the chock is in the lowered position. After contact with the wheel, the drive mechanism will continue to drive a portion of the chock until the chock moves to the raised position.

SUMMARY OF THE INVENTION

One problem with the above noted powered wheel chocking devices is that the chock can prematurely move to the raised position before the chock is positioned in contact with the vehicle wheel. This can be caused by an impediment (e.g., ice, debris, damage or other discontinuity) in the path of the chock. Such an impediment can restrict movement of the chock to such a degree that the device acts as if the vehicle wheel has been engaged, when in fact it has not been engaged. The result is that the chock can prematurely move to the raised position. After the chock is raised, the drive mechanism can overcome the impediment and continue moving the raised chock toward the vehicle wheel. If the vehicle includes depending obstructions (e.g., tool boxes, spare tires, etc.) hanging down from the vehicle in the chock's path, the raised chock could engage the obstruction and give a false indication that the vehicle wheel has been properly engaged.

Another problem with some of the prior art devices is that the drive mechanisms are unnecessarily complex, requiring sliding support blocks and collapsing chock wheels. Some of these devices also position the drive mechanism offset from the wheel path, thereby requiring the use of two chocks and a centered drive mechanism to compensate for the misaligned forces involved in securing the vehicle.

The present invention alleviates the above noted problem by providing a wheel chocking device that is designed to deflect around any obstructions that could be depending from a vehicle in the chock's path. In this regard, the invention is embodied in a method of securing a vehicle at a desired location- using a wheel chocking device having a chock movable between a lowered position and a raised position. The method comprises the steps of positioning the vehicle at the desired location with the chock in the lowered position, raising the chock to the raised position, moving the raised chock toward a wheel of the vehicle, sensing the presence of an obstruction on the vehicle, lowering the raised chock to an intermediate position to allow the chock to pass under the obstruction, and contacting the chock with the wheel.

The present invention also provides a wheel chocking device having a drive mechanism that is positioned underneath the chock so that the vehicle actually drives over the drive mechanism. The drive mechanism of the present invention is simplified with the use of a drive screw and a partial drive nut that facilitates the use of support members for supporting the drive screw at spaced locations along the length of the drive screw. A multi-link chock facilitates use of the device on wheels of varying sizes.

BRIEF DESCRIPTION OF THE DRAWINGS

FIG. 12 is a section view taken along line 12—12 in FIG. 2.

FIG. 13 is a section view taken along line 13—13 in FIG. 2.

FIG. 14 is a section view taken along line 14—14 in FIG. 2.

FIG. 15 is a section view taken along line 15—15 in FIG. 2.

DETAILED DESCRIPTION

Figure 1:
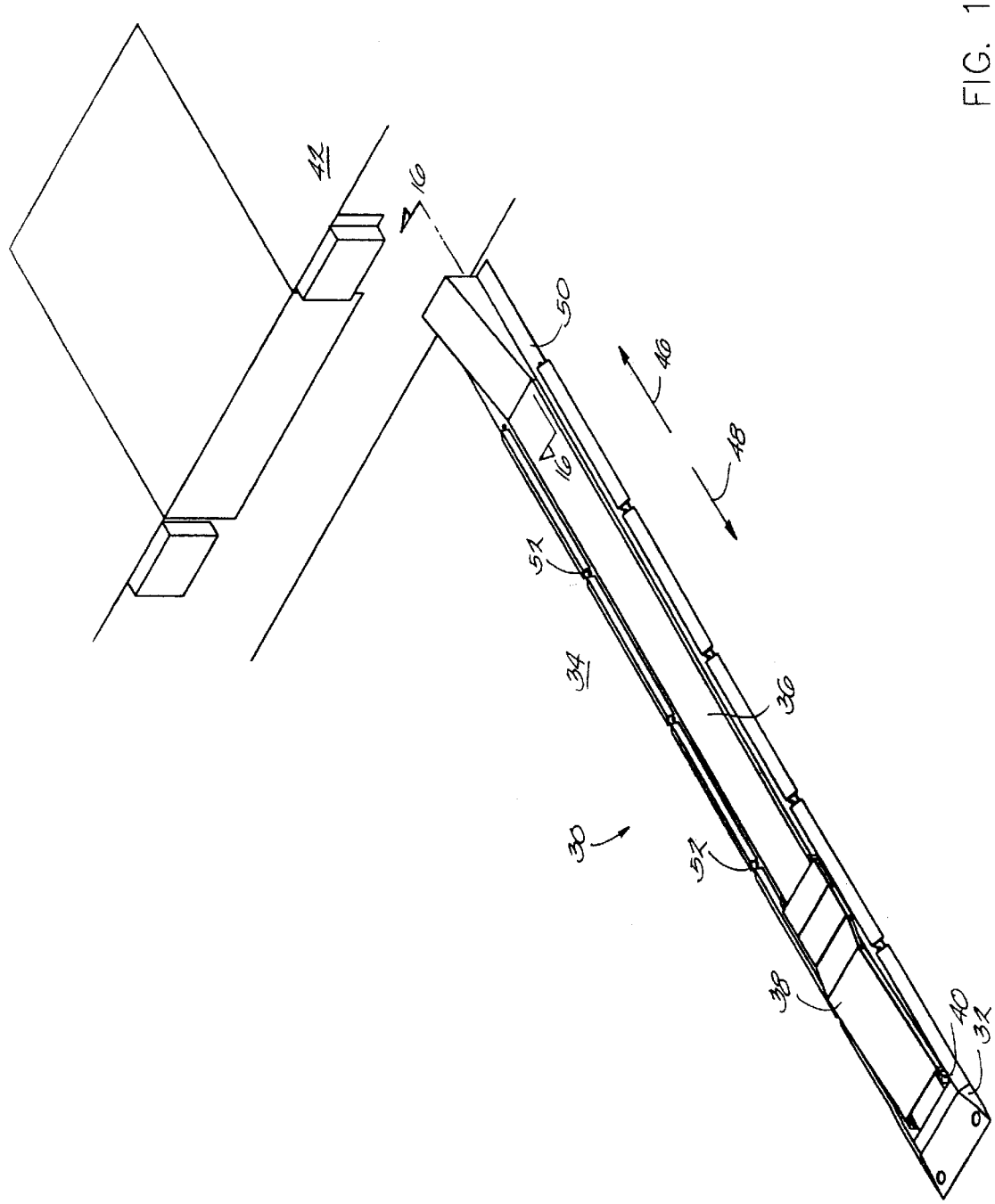
FIG. 1 is a perspective view of a wheel chocking device embodying the present invention and positioned at a loading dock.

The illustrated wheel chocking device 30 generally includes a base frame 32 adapted to be secured to an underlying surface 34, a cover plate 36 covering the base frame 32, a chock 38 positioned over the cover plate 36 and adapted to slide relative to the base frame 32, and a drive mechanism 40 positioned substantially within the base frame 32 and under the cover plate 36. The wheel chocking device 30 is specifically designed to be positioned adjacent to a loading dock 42 so that a vehicle that is backed against the loading dock 42 can be secured in position adjacent to the loading dock 42. As used herein, the rearward direction denotes movement toward the loading dock 42 as resented by the arrow 46, and the frontward direction is opposite to the rearward direction as represented by the arrow 48.

Figure 2:
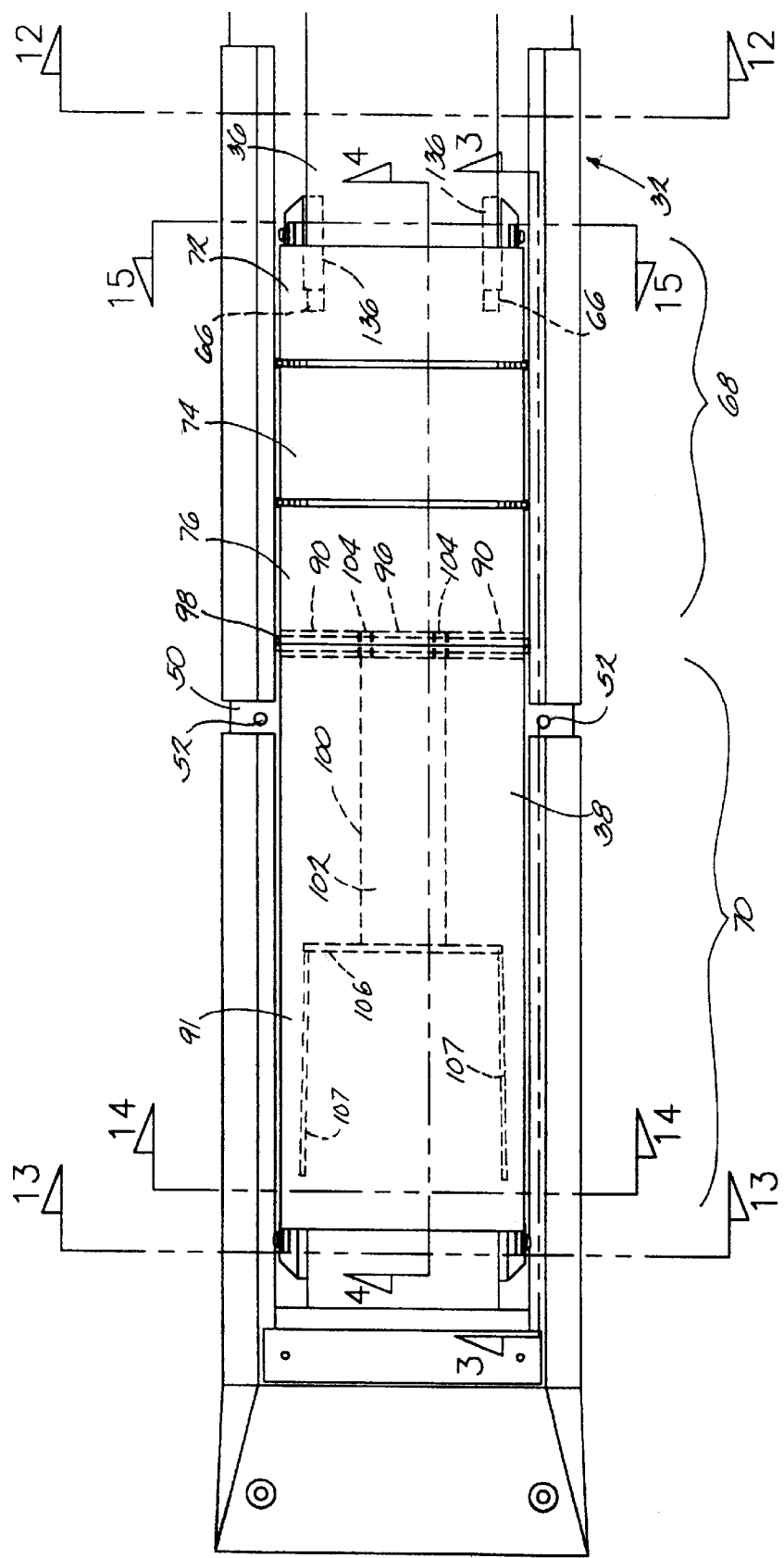
FIG. 2 is a partial top view of the wheel chocking device of FIG. 1.

Referring to FIGS. 1, 2 and 12, the base frame 32 includes a base plate 50 that is designed to be secured to the surface 34 by a series of fasteners 52. For example, the illustrated base plate 50 is secured to a concrete or asphalt driveway in front of the loading dock 42. Referring specifically to FIG. 12, inner side walls 54 are secured to the base plate 50 and define a recess 56 therebetween for housing a portion of the drive mechanism 40, as described below in more detail. Outer side walls in the form of guide members 58 and support members 60 define side slots 62 for guiding the drive mechanism 40, as described below in more detail. The inner side walls 54 and guide members 58 cooperatively provide a non-securing support for the cover plate 36. That is, the cover plate 36 rests upon but is not secured to the inner side walls 54 and guide members 58. Side angles 64 are secured to the longitudinal edges of the base plate 50 to protect the wheel chocking device 30 from potential damage from snow plows. The side angles 64 could be made detachable (e.g., by attaching with bolts) from the base plate 50. The base plate 50 is further provided with stop blocks 66 (FIGS. 2 and 15) that stop movement of the drive mechanism 40 in the frontward direction, as described below in more detail.

The cover plate 36 extends along substantially the entire length of the base frame 32 to provide a protective cover for the drive mechanism 40. The cover plate 36 allows a vehicle 44 to drive on top of the wheel chocking device 30 without damaging any of the components of the drive mechanism 40. The cover plate 36 is secured to the base frame 32 only at its ends, and thus the middle portion of the cover plate 36 is allowed to move vertically away from the base frame 32 or "float" to allow portions of the drive mechanism 40 to pass between the base frame 32 and the cover plate 36. This allows the drive mechanism 40 to be interconnected with the chock 38.

Figure 3:
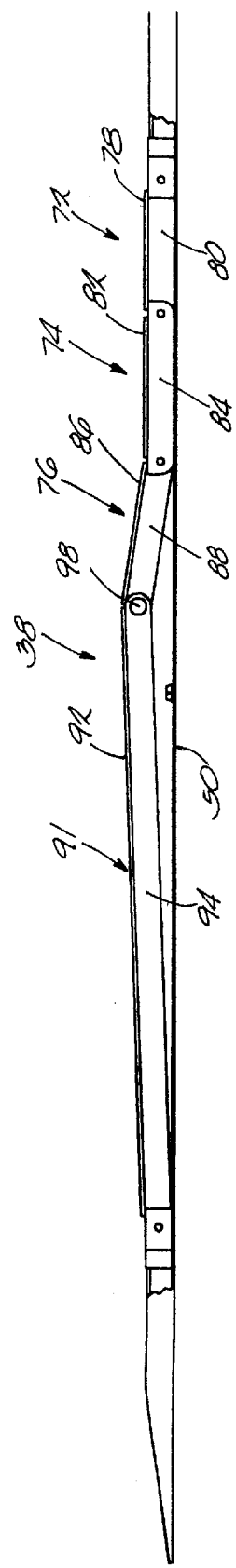
FIG. 3 a section view taken along line 3—3 in FIG. 2.

Referring to FIGS. 2–8, the chock 38 generally includes a rear portion 68 adapted to engage a vehicle wheel 108, and a front portion 70 that is movably interconnected with and provides support to the rear portion 68. Referring specifically to FIGS. 2 and 3, the rear portion 68 comprises a series of three links: a lower link 72, a middle link 74 and an upper link 76. The lower link 72 includes a lower plate 78 and a lower side member 80 secured near each side of the lower plate 78 (see FIGS. 3 and 15). The middle link 74 includes a middle plate 82 and a middle side member 84 secured near each side of the middle plate 82 (FIG. 3). The middle side members 84 are pivotally connected to the lower side members 80. The upper link 76 comprises an upper plate 86 and an upper side member 88 secured near each side of the upper plate 86. The upper side members 88 are pivotally secured to the middle side members 84. Upper tube members 90 (FIGS. 2 and 4) are secured to the upper plate 86 to provide a location for securing the upper link 76 to the front portion 70 of the chock 38.

The front portion 70 of the chock 38 includes a single large link 91 comprising a large plate 92 and a large side member 94 secured near each side of the large plate 92 (FIG. 3). A front tube member 96 (FIG. 2) is secured to the large plate 92 in alignment with the upper tube members 90. The front tube member 96 and upper tube members 90 are designed to receive a pin member 98 for pivotally securing the large link 91 with the upper link 76.

A support link 100 is pivotally connected to the pin member 98 (FIGS. 2 and 4–8). The support link 100 includes a support plate 102 and two hinge members 104 secured to each side of the support plate 102. The hinge members 104 are positioned between the upper tube members 90 and the front tube member 96 and are designed to receive the pin member 98 so that the support link 100 is pivotally attached to the pin member 98. A cross member 106 is secured to the other end of the support plate 102 to provided a more stable footing for the support link 100 when it engages the cover plate 36, as described below in more detail. The cross member 106 also provides an attachment point for two link members 107. In the illustrated embodiment, the link member 107 are made from a flexible material, such as chain, and their function is described below in more detail.

Figure 4:
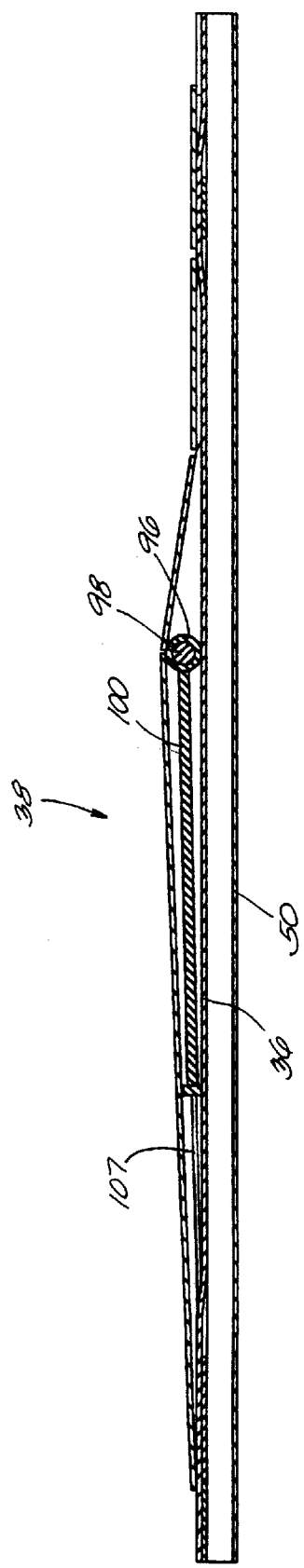
FIG. 4 is a schematic section view taken along line 4—4 in FIG. 2 with the chock in a lowered position.
Figure 5:
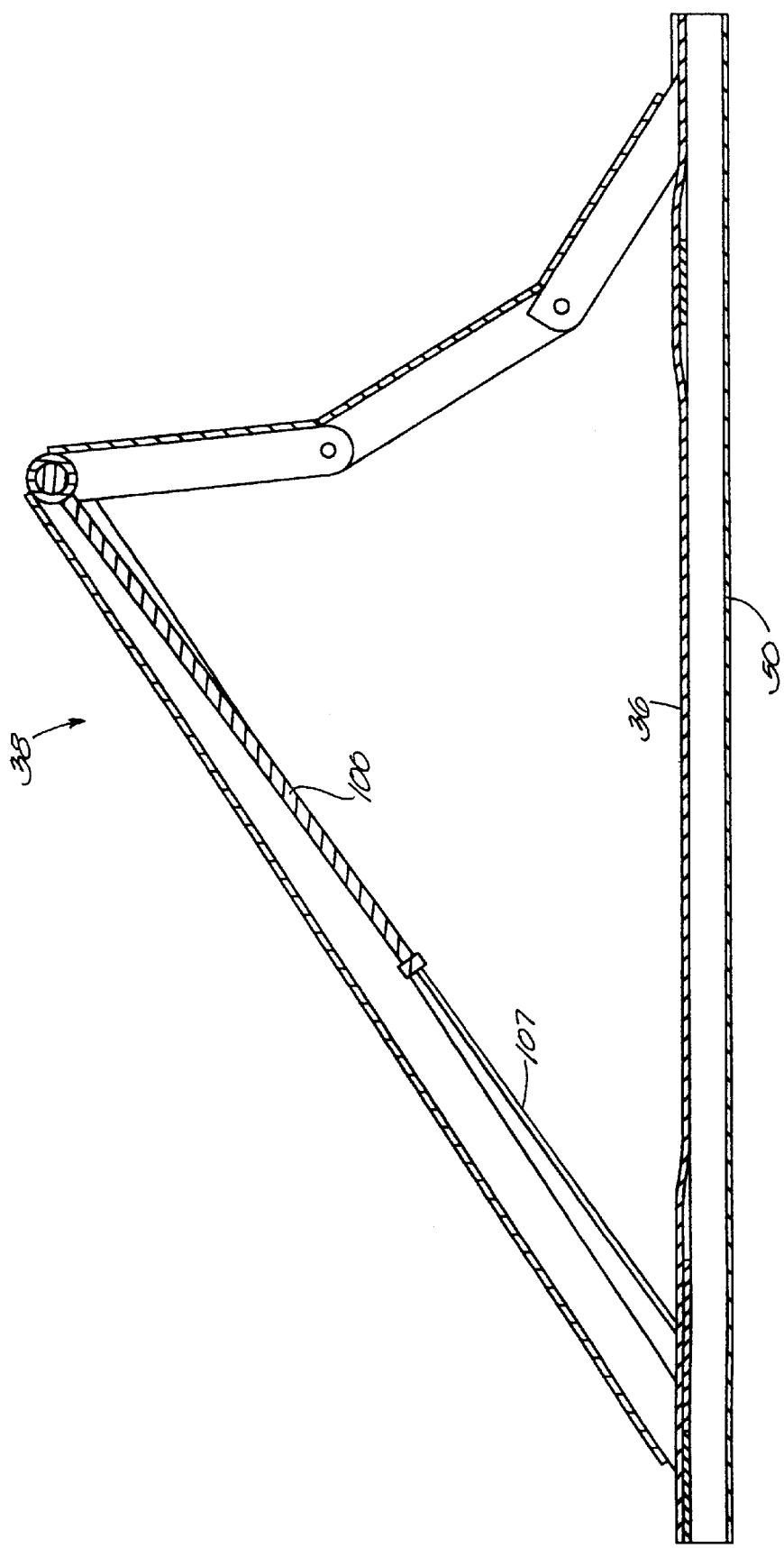
FIG. 5 is the section view of FIG. 4 with the chock in a raised position.
Figure 6:
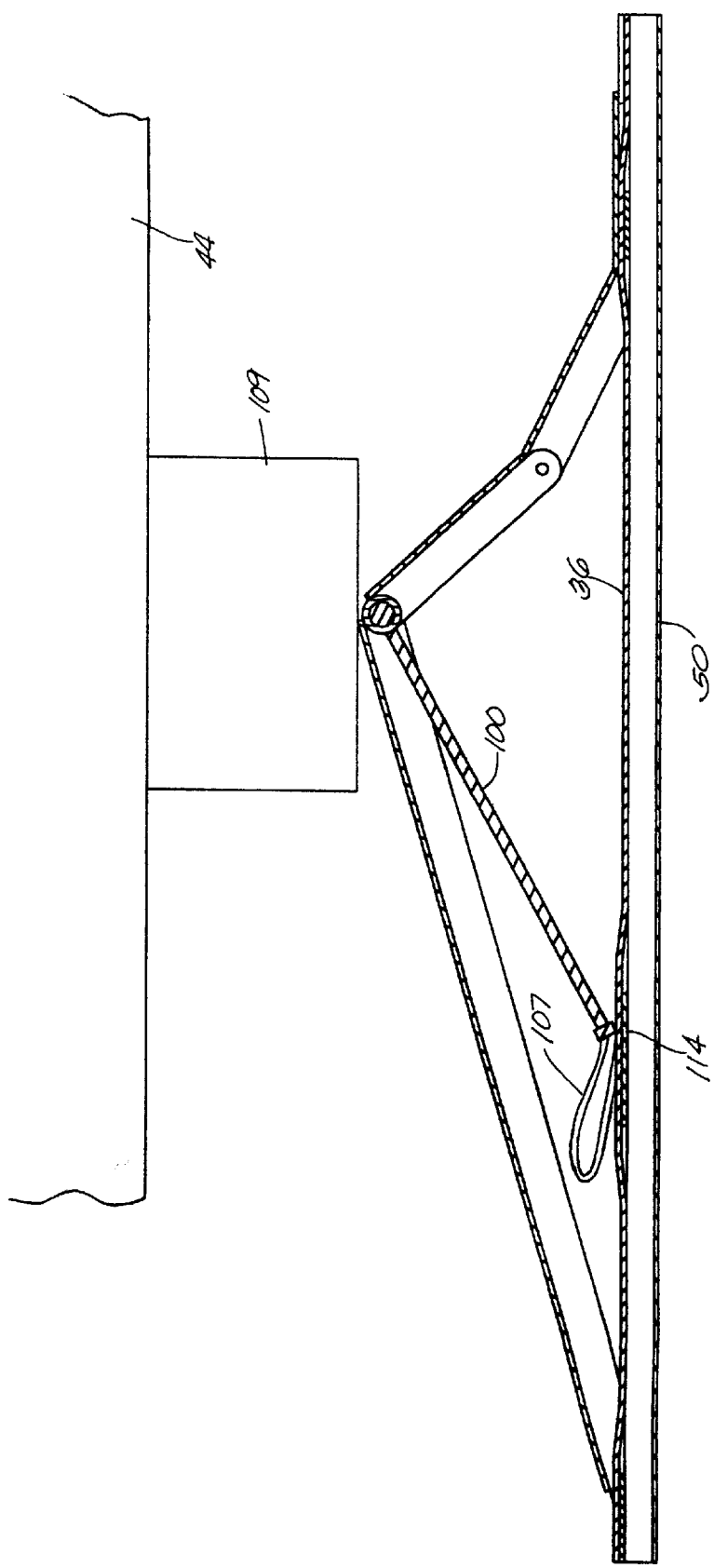
FIG. 6 is the section view of FIG. 4 with the chock in an intermediate position deflecting around an obstruction.
Figure 8:
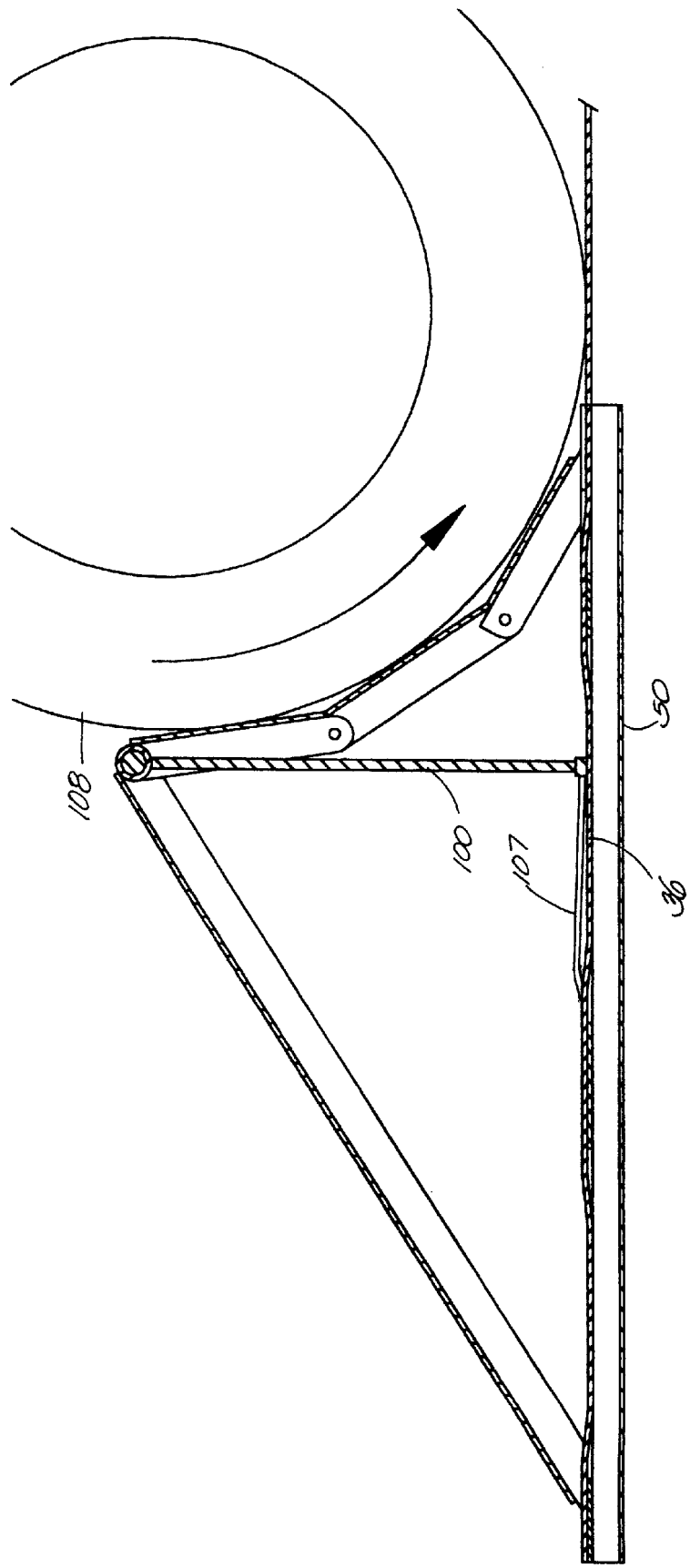
FIG. 8 is the section view of FIG. 4 illustrating the action of the chock when the vehicle wheel is driven.

The above-described chock 38 is designed to slide longitudinally (i.e., in the frontward and rearward directions) relative to the base frame 32 and cover plate 36. Such sliding motion allows the chock 38 to be moved into contact with a vehicle wheel 108 positioned on the cover plate 36. More specifically, the chock 38 can be moved from a stored position (FIGS. 3 and 4) to a raised and unsupported position (FIG. 5). When the chock is in the unsupported position, the support link 100 does not support the chock 38. In this unsupported position, the chock 38 is designed to have the ability to deflect around an obstruction 109 hanging down from the vehicle 44 (FIG. 6). Once the raised chock 38 is brought into contact with the vehicle wheel 108, the support link 100 will move to a supporting position in a manner described below in more detail. In the supporting position, the support link 100 will prevent the chock 38 from deflecting downward in the event that the vehicle attempts to drive away from the loading dock (FIG. 8).

The chock 38 is moved and raised by the drive mechanism 40. The drive mechanism 40 is best shown in FIGS. 9–15, and includes, inter alia, a front slider 110, a rear slider 112, and a drive member 114.

Figure 9:
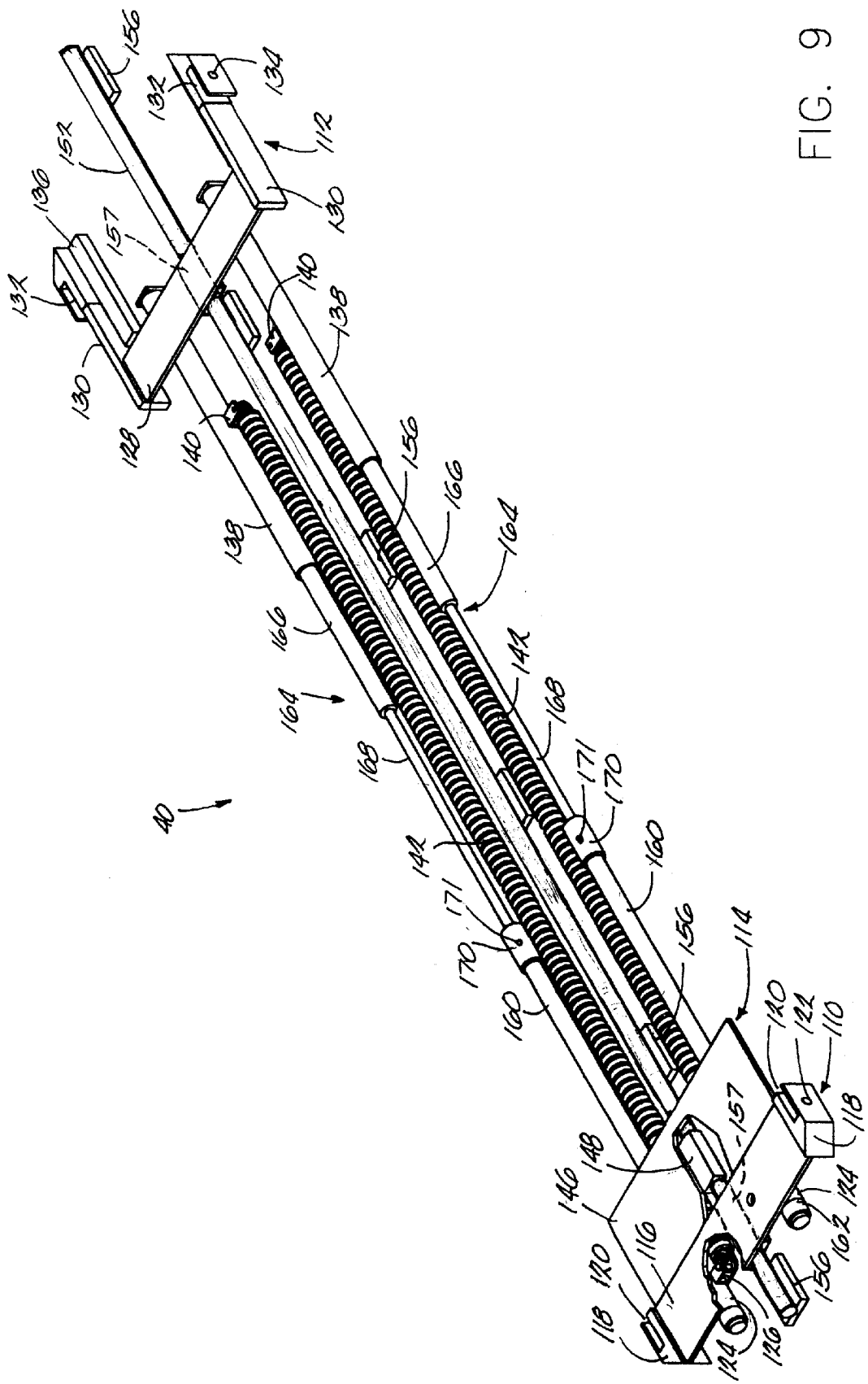
FIG. 9 is a perspective view of the interior components of the chock when the chock is in the lowered position.

The front slider 110 comprises a front plate 116 slidably positioned between the base frame 32 and the cover plate 36 (FIGS. 9 and 13). A front block 118 is secured to each side edge of the front plate 116. Each front block 118 includes a front slot 120 and a front hole 122 for facilitating pivotal engagement with the large side members 94 of the link (see FIGS. 2, 3 and 13). The front slider 110 further includes two front tubes 124 secured to the bottom surface of the front plate 116, and a front spring bracket 126 secured to each front tube 124. Because of the pivotal engagement between the front slider 110 and the large link 91, it can be seen that movement of the front slider 110 will result in movement of the front end of the large link 91.

The rear slider 112 includes a rear plate 128 slidably positioned between the base frame 32 and the cover plate 36 (FIGS. 9 and 15). A rear block 130 is secured to each side edge of the rear plate 128. Each rear block 130 includes a rear slot 132 and a rear hole 134 for facilitating pivotal engagement with the lower side members 80 of the lower link. Each rear block 130 is provided with a bar member 136 positioned within the side slots 62 formed by the guide members 58 of the base frame 32 (FIGS. 2 and 15). The bar members 136 provide guidance to the rear slider 112 and prevent the rear slider 112 from moving upwardly away from the base frame 32. The bar members 136 further provide a means for stopping movement of the rear slider 112 in the frontward direction. More specifically, the bar members 136 will contact the stop blocks 66 of the base frame 32 to stop the rear slider 112 in the stored position (see FIG. 2). The rear slider 112 further includes two spring tubes 138 secured to the bottom surface 34 of the rear plate 128, and a rear spring bracket 140 secured to each spring tube.

The front slider 110 and rear slider 112 are interconnected by two coil springs 142 secured on one end to the front spring brackets 126 and on the other end to the rear spring brackets 140 (FIG. 9). The coil springs 142 provide a biasing force tending to pull the front slider 110 and rear slider 112 toward each other. Such movement of the front slider 110 and rear slider 112 toward each other will result in the chock 38 moving to the raised position. Thus, the chock 38 is biased to the raised position.

The drive member 114 is operatively positioned between the front slider 110 and the rear slider 112. The drive member 114 is designed to drive the rear slider 112 when the chock 38 is being moved in the rearward direction, and is designed to drive the front slider 110 when the chock 38 is being moved in the frontward direction. The drive member 114 comprises a drive plate 146 slidably positioned between the base frame 32 and the cover plate 36, and a drive block 148 secured to the bottom surface of the drive plate 146 (FIGS. 9 and 14). The drive block 148 includes internal threads 150 for threadedly engaging a screw member 152. The drive block 148 includes an open portion 154 such that the internal threads 150 do not engage the entire outer circumference of the screw member 152.

The open portion 154 of the drive block 148 allows an arcuate segment of the screw member 152 to be supported by a series of lower screw supports 156 spaced along the longitudinal length of the screw member 152. In a preferred embodiment, the longitudinal position of the lower screw supports 156 is limited by a plurality of spaced weld beads 155 (FIGS. 12–15) between the base frame 32 and the side walls 54. Upper screw supports 157 are secured to each of the front plate 116 and the rear plate 128 (FIGS. 9–15). The upper and lower screw supports 156,157 are preferably made from a low friction material (e.g., brass, plastic, etc.) to provide low friction engagement between the screw member 152 and the lower screw supports 156. In the illustrated embodiment, the upper and lower screw supports are made from a polymer material, such as ultra high molecular weight polyethylene.

The drive member 114 further includes two drive tubes 158 (FIGS. 10 and 14) secured to the bottom surface of the drive plate 146. The drive tubes 158 are positioned in alignment with the front tubes 124 on the front slider 110. The drive tubes 158 and front tubes 124 slidably receive a rod 160 having collars 162 that prevent the rod 160 from sliding out of the tubes. A gas spring 164 is operatively positioned between each rod 160 and the corresponding spring tube 138 of the rear slider 112. Each gas spring 164 includes a cylinder 166 (FIG. 9) slidably positioned within the corresponding spring tube, and a piston rod 168 secured to the corresponding rod 160 by a coupling 170 and set screw 171. In the illustrated embodiment, the piston rod 168 is biased away from the cylinder 166 at a force of about 100 lbs. The link members 107 are secured to opposing sides of the drive member 114, and are designed to control the position of the support link 100 in relation to the position of the drive member 114.

The above-described components of the drive mechanism 40 operate in the following manner to provide movement to the chock 38. In the stored position, the drive member 114 pushes the front slider 110 all the way to the front end of the base frame 32 (FIGS. 4 and 9). In this position, the rear slider 112 is held in spaced relation to the front slider 110 by the stop blocks 66 interacting with the bar members 136 (FIG. 2). In the stored position, the coil springs 142 are stretched, and the cylinder 166 of the gas spring 164 is partially pulled out of the spring tubes 138. The support link 100 is held in a non-supporting position by the link members 107.

Figure 10:
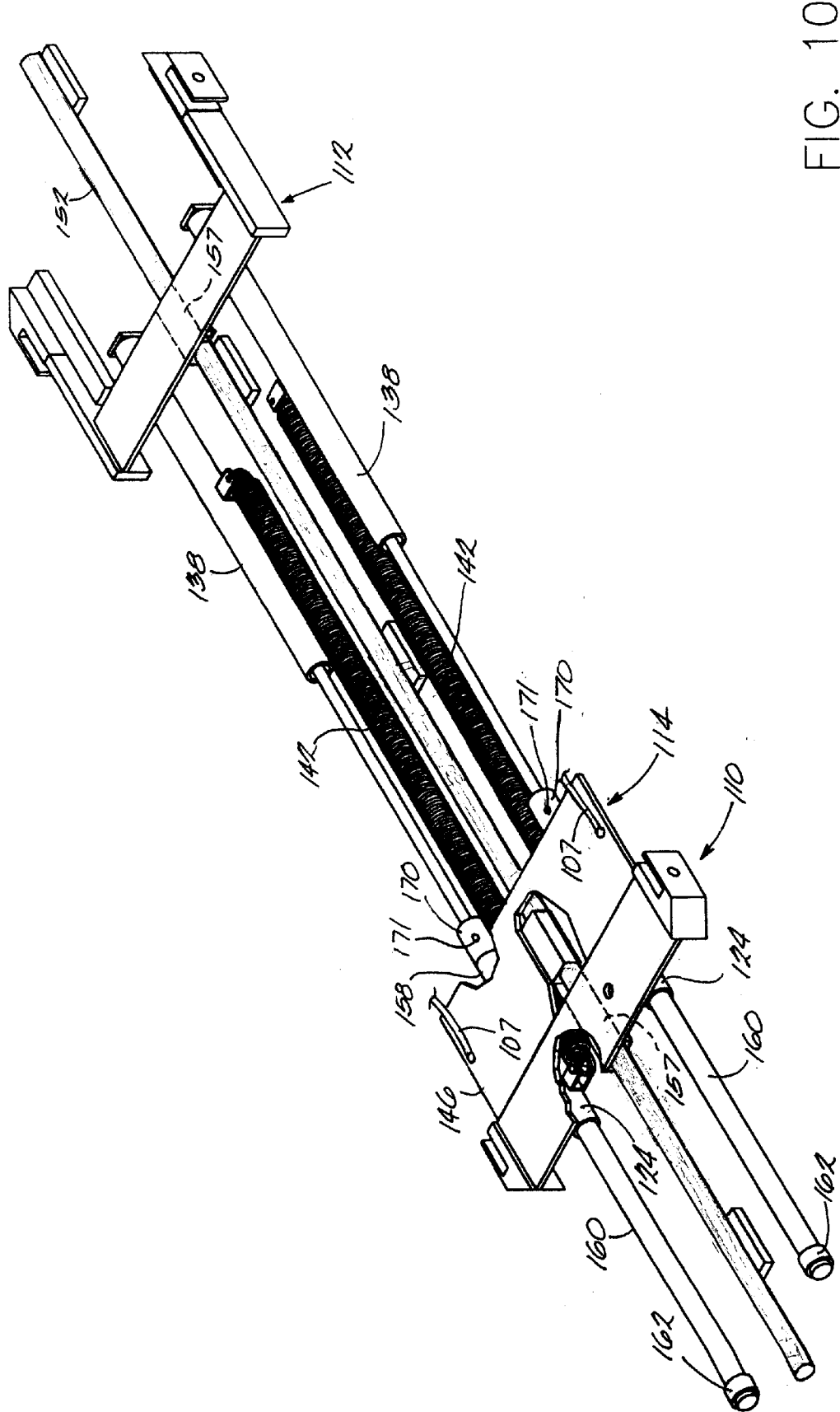
FIG. 10 is the perspective view of FIG. 9 with the chock in a raised position.

Movement of the device is initiated by rotating the screw member 152, which results in movement of the drive member 114 in the rearward direction. Due to the biasing force of the coil springs 142, the front slider 110 will follow the rearward movement of the drive member 114, thereby resulting in raising of the chock to a raised position (FIGS. 5 and 10). At this point, the drive member 114 contacts the couplings 170, and the cylinders 166 are bottomed out within the spring tubes 138. Further movement of the drive member 114 therefore results in driving of the rear slider 112 in the rearward direction. The support link 100 is held in a non-supporting position by the link members 107.

If the raised chock encounters an obstruction 109 while moving rearwardly toward the wheel, the chock will deflect around the obstruction 109 and will subsequently return to the raised position after the obstruction 109 has been passed (FIG. 6). Such downward deflection of the chock is facilitated by the compliant biasing of the front slider 110 toward the rear slider 112, and further by the fact that the rear slider 112 is being driven. More specifically, if an obstruction 109 is encountered, the rear slider 112 will continue to be driven rearwardly, and the front slider 110 is allowed to slide forwardly, if necessary, to allow the chock to deflect downwardly to an intermediate position. Because the support link 100 is in a non-supporting position, the support link 100 does not interfere with the downward deflection of the chock. Furthermore, the flexible nature of the illustrated link members 107 allows the drive member 114 to move relative to the support link 100. Rather than have the wheel chock contact the obstruction, the wheel chock could be provided with a proximity sensor that senses the presence of an obstruction. If an obstruction is sensed, then the chock could be automatically lowered to a height lower than the obstruction (e.g., using a powered lowering means, such as an electric motor) until the obstruction is passed.

Figure 7:
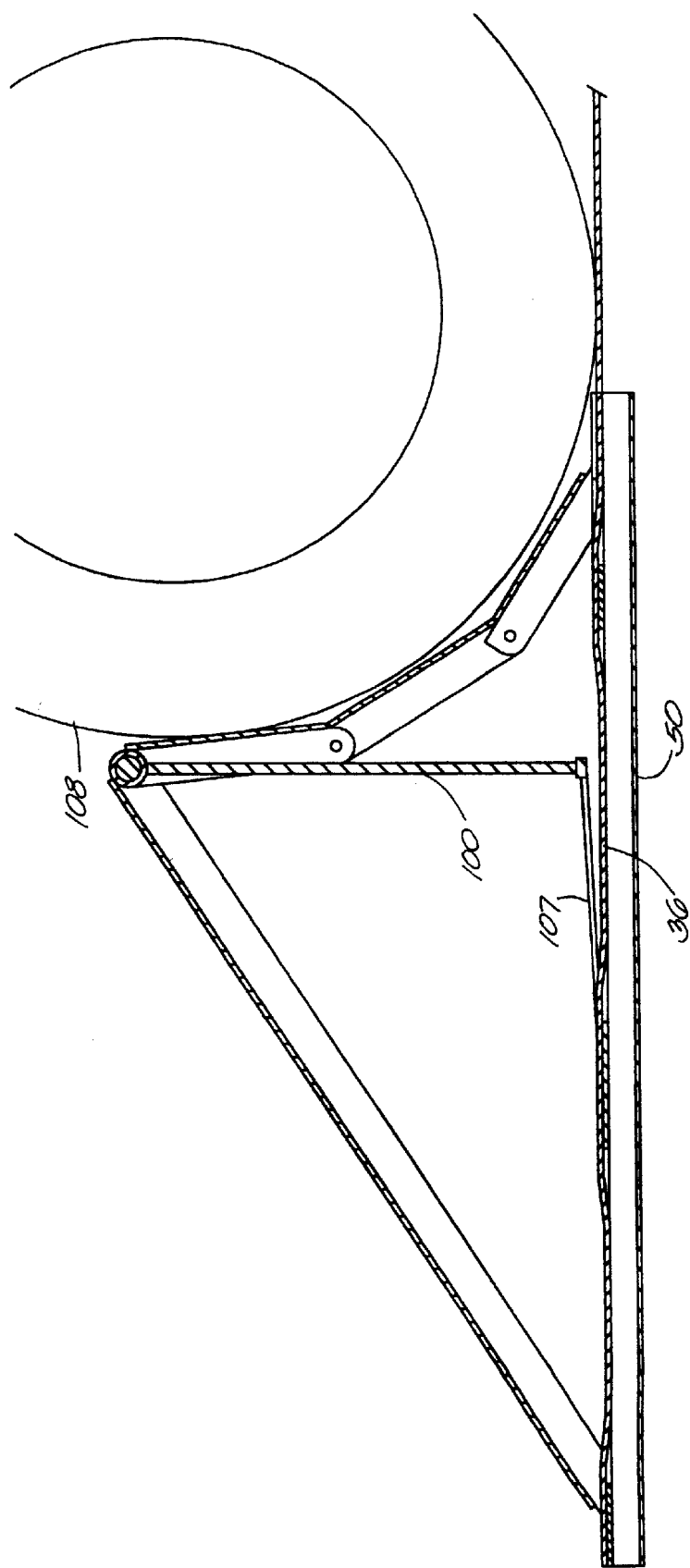
FIG. 7 is the section view of FIG. 4 with the chock in a raised and supported position at a vehicle wheel.
Figure 11:
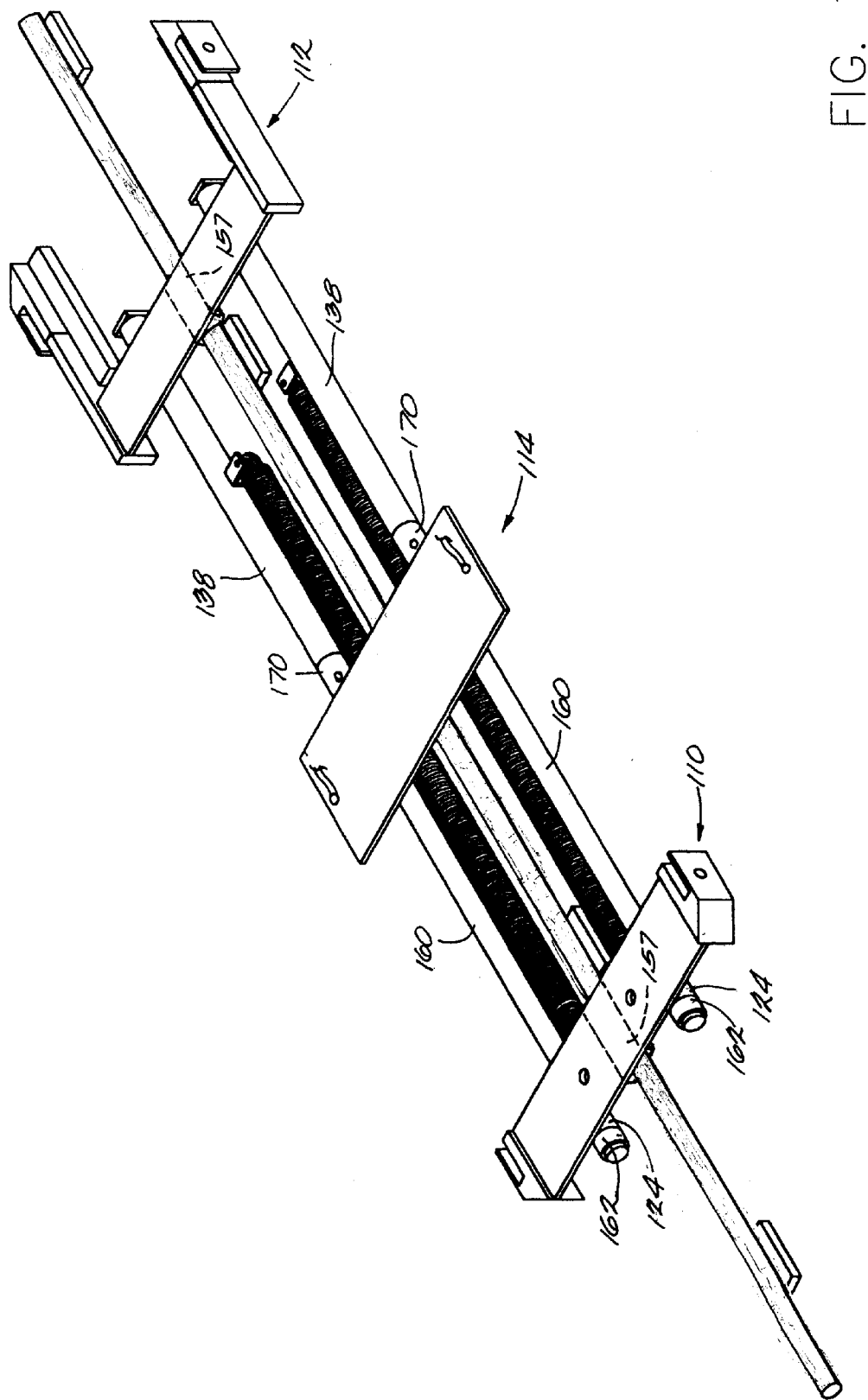
FIG. 11 is the perspective view of FIG. 9 with the chock in a raised and supported position.

Once the vehicle wheel 108 has been engaged by the chock, the rear slider 112 will stop, but the drive member 114 will continue rearward movement until the collars 162 of the rods 160 engage the front tubes 138 and couplings 170 engage the spring tubes 138 (FIGS. 7 and 11). Such movement of the drive member 114 results in the support link 100 moving to the supporting position, thereby placing the chock 38 in the raised and supported position.

Movement of the chock 38 back to the stored position is accomplished in substantially the reverse order. It is noted, however, that movement of the chock 38 in the frontward direction is accomplished by driving the front slider 110. In this manner, the chock 38 will be allowed to deflect downwardly to an intermediate position to avoid any obstructions that may be encountered when moving the chock 38 back to the stored position.

Figure 17:
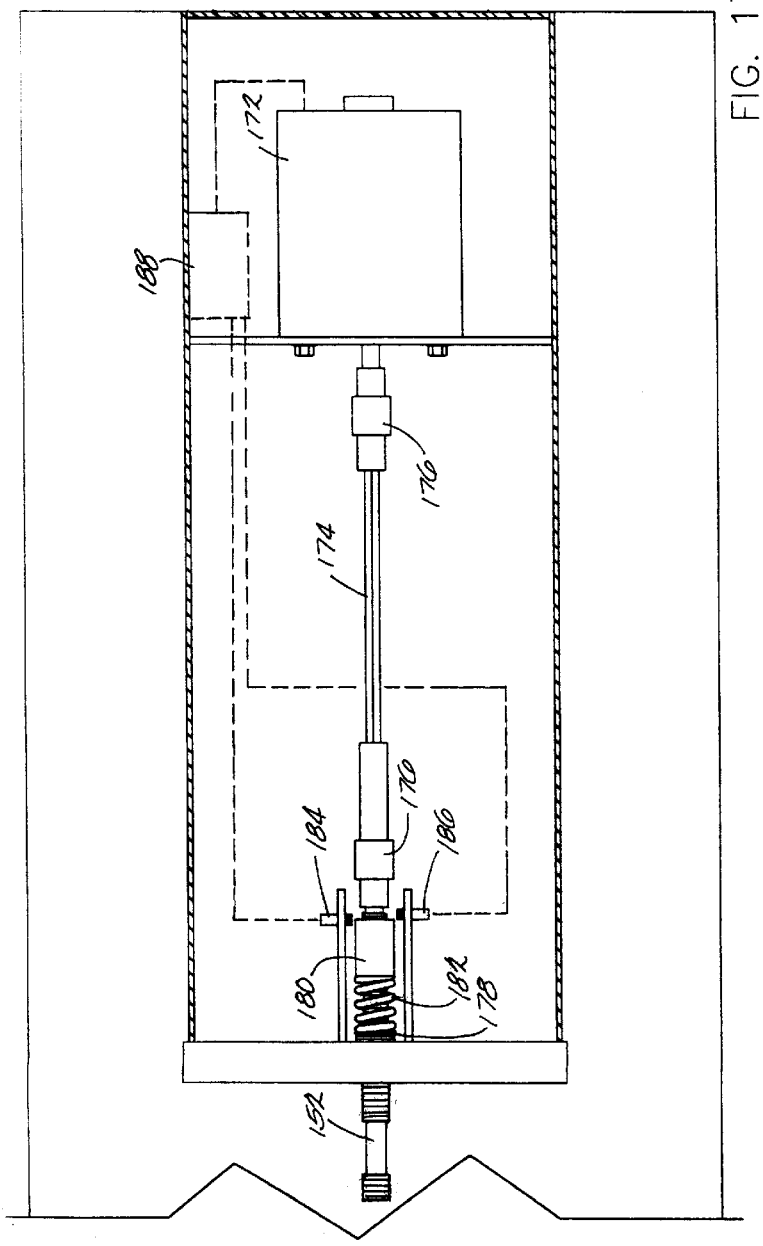
FIG. 17 is a top section view taken along line 17—17 in FIG. 16.
Figure 16:
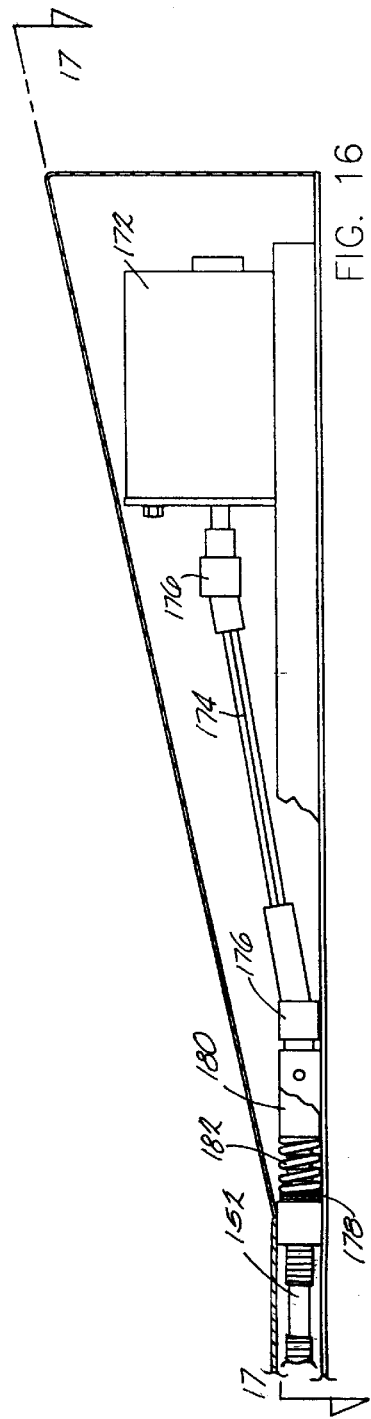
FIG. 16 is a side section view taken along line 16—16 in FIG. 1.

The illustrated screw member 152 is driven by a power mechanism in the form of an electric motor 172 interconnected with the screw member 152 by a drive shaft 174 (FIGS. 16 and 17). The drive shaft 174 includes flexible couplings 176 for accommodating misalignment of the motor shaft with the screw member 152 (only one end is shown). The screw member 152 is slidably mounted within screw bushings 178 positioned on either end of the screw member 152. That is, the screw member 152 is supported by, but is not axially restrained by the screw bushings 178. Each end of the screw member 152 is provided with a screw collar 180 secured to the screw member 152, and a biasing spring 182 positioned between the screw bushing and the screw collar 180. In this manner, the screw member 152 is biased to a neutral position (FIG. 17) relative to the screw bushings 178.

A sensing mechanism is provided for sensing the axial position of the screw member 152. In the illustrated embodiment, the sensing mechanism includes a first sensor 184 positioned in alignment with the screw collar 180 when the screw member 152 is in a neutral position, and a second sensor 186 positioned to detect movement of the screw member 152 in the rearward direction. When the screw member 152 is being used to move the chock in either direction, the screw member 152 is positioned in the neutral position. When the chock has engaged a vehicle wheel, the screw member 152 will move frontwardly due to the resistance encountered by the drive member 114. Such frontward movement of the screw member 152 will be detected by the first sensor 184. Conversely, when the chock is in the stored position, the screw member 152 will move rearwardly due to the resistance encountered by the bar members 136 on the stop blocks 66. Such rearward movement of the screw member 152 will be detected by the second sensor 186. Information regarding the axial position of the screw member 152 can be provided to a control mechanism 188 (shown schematically in FIG. 17) and used to selectively disengage the power drive mechanism. More specifically, when the screw member 152 moves rearwardly, it is an indication that the stored position has been reached and the motor can be deactivated. Conversely, frontward movement of the screw member 152 indicates that a wheel has been engaged and the motor can be deactivated.

Alternatively, the power mechanism can be provided with a torque-limiting device, such as a torque or current sensor, to deactivate the power mechanism. As another alternative, a proximity sensor can be used to sense when the drive member 114 is in the stored position (FIGS. 3, 4 and 9). The use of a proximity sensor is advantageous in that it is a positional sensor that directly measures the position of the drive member 114, as opposed to a conditional sensor that measures a certain condition of the chock and infers the position of the chock.

The above-noted mechanisms for sensing the position of the wheel chock can be used to provide signals to a communication system. For example, the loading dock can be provided with a dock lighting system for communicating with the dock workers and a driver lighting system for communicating with the driver of the vehicle. Each lighting system can include a red light and a green light. When the chock is in the stored position, the driver lighting system will show a green light, indicating that the driver can enter or exit the loading dock, and the dock lighting system will show a red light, indicating that no loading or unloading operations should be performed. After the vehicle is positioned at the dock and the chock is activated to move toward the wheel of the vehicle, both lighting systems will show a red light and an audible warning can be provided to indicate that the chock is being moved. After the chock is secured at the vehicle wheel, the dock lighting system will show a green light indicating that loading and unloading operations can be performed, and the driver lighting system will remain red, indicating that the vehicle is secured and that the driver should not attempt to pull away from the dock. After loading and unloading operations are complete, the chock is moved back toward the stored position, during which time both lighting systems will show a red light and an audible warning will indicate that the chock is being moved.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of securing a vehicle at a desired location using a wheel chocking device having a chock movable between a lowered position and a raised position, said method comprising the steps of:

positioning the vehicle at the desired location with the chock in the lowered position;

raising the chock to the raised position;

moving the raised chock toward a wheel of the vehicle;

sensing the presence of an obstruction on the vehicle;

automatically lowering the raised chock to an intermediate position to allow the chock to pass under the obstruction; and contacting the chock with the wheel.

2. The method of claim 1, wherein the chock includes a rear portion for engaging the wheel, and wherein said moving step includes the step of driving the rear portion of the chock.

3. The method of claim 2, wherein the chock further includes a front portion movably connected to the rear portion, and wherein said method further comprises the step of moving the chock away from the wheel by driving the front portion of the chock.

4. The method of claim 1, wherein said sensing step includes the step of contacting the chock with the obstruction.

5. The method of claim 1, further comprising the step of compliantly holding the chock in the raised position such that the chock is vertically deflectable from the raised position to a lower intermediate position.

6. The method of claim 5, wherein the chock includes a rear portion and a front portion, and wherein said holding step includes the step of forcing the front and rear portions together using a biasing member.

7. The method of claim 1, further comprising the step of securing the chock in the raised position after said contacting step.

8. The method of claim 7, wherein said securing step includes the step of moving a supporting member from a non-supporting position to a supporting position.

9. A wheel chocking device adapted to secure a vehicle in a desired location, said device comprising:
a chock movable between a lowered position and a raised position and drivable to a rearward direction toward a wheel engaging position and in a frontward direction opposite said rearward direction, said chock including;
a rear portion adapted to engage a wheel of the vehicle; and
a front portion movably connected to said rear portion, wherein said chock is raised by moving said rear and front portions toward each other and is lowered by moving said rear and front portions away from each other; and
a drive mechanism drivingly connected to said rear portion to move, said entire chock in the rearward direction.

10. The wheel chocking device of claim 9, wherein said drive mechanism is drivingly connected to said chock such that said drive mechanism drives said front portion when moving said chock in the frontward direction.

11. The wheel chocking device of claim 9, further comprising a compression spring member operatively positioned between said drive mechanism and said rear portion.

12. The wheel chocking device of claim 11, wherein said compression spring member includes a gas spring.

13. The wheel chocking device of claim 9, further comprising a member interconnecting said drive mechanism with said front portion, said interconnecting member being adapted to secure the position of said front portion when said drive mechanism holds said rear portion in engagement with a vehicle.

14. The wheel chocking device of claim 13, wherein said interconnecting member includes a rod.

15. A wheel chocking device adapted to secure a vehicle in a desired location, said device comprising:
a longitudinally extending base frame including side walls defining a recess;
a chock positioned above said base frame and movable longitudinally relative to said base frame;,
a drive mechanism positioned within said recess and drivingly connected to said chock; and
a cover plate positioned between said base frame and said chock, said cover plate substantially covering said recess.

16. The wheel chocking device of claim 15, wherein said cover plate includes longitudinally extending side edges, and wherein said drive mechanism includes a plate member positioned under said cover plate and extending beyond said side edges of said cover plate.

17. The wheel chocking device of claim 16, wherein said cover plate moves to allow passage of said plate member between said base frame and said cover plate.

18. The wheel chocking device of claim 15, wherein said cover plate spans substantially the entire longitudinal extent of said base frame.

19. The wheel chocking device of claim 15, wherein said cover plate and base frame are adapted to support a wheel of a vehicle.

20. A wheel chocking device adapted to secure a vehicle in a desired location, said device comprising:
a chock movable between a lowered position and a raised position; and
a drive mechanism drivingly connected to said chock so as to drive said chock between said lowered and raised positions, said drive mechanism including:
a screw member mounted for rotation relative to said chock and having an outer circumference; and
a drive member having internal threads that cooperatively engaging said screw member, said drive member including an open portion such that said internal threads do not engage the entire outer circumference of said screw member.

21. The wheel chocking device of claim 20, wherein said drive member engages more than half of said outer circumference.

22. The wheel chocking device of claim 20, wherein said screw member includes two ends and an intermediate portion between said two ends, and wherein said device further comprises a support member positioned to support said intermediate portion of said screw member.

23. The wheel chocking device of claim 22, wherein said support member includes an arcuate recess for supporting said screw member.

24. The wheel chocking device of claim 22, wherein said screw member includes an outer circumference, and wherein said support member supports half or less of said outer circumference.

25. The wheel chocking device of claim 22, wherein said support member comprises a polymer material in contact with said screw member.

26. The wheel chocking device of claim 22, wherein said device includes a plurality of said support members spaced from each other along a length of said screw member.

27. A wheel chocking device adapted to secure a vehicle in a desired location, said device comprising:
a base frame;
a chock movable relative to said base frame between a lowered position and a raised position; and
a drive mechanism drivingly connected to said chock so as to drive said chock between said lowered and raised positions, said drive mechanism including:
a screw member mounted on said base frame for rotation about an axis, said screw member being axially movable relative to said base frame between a first position and a second position;
a drive member having threads that cooperatively engage said screw member; and
a sensor for sensing an axial position of said screw member.

28. The wheel chocking device of claim 27, wherein said screw member is biased toward the first position.

29. The wheel chocking device of claim 28, wherein said screw member is biased by a spring.

30. The wheel chocking device of claim 27, wherein said screw member is designed to move from the first position to the second position when said chock engages a vehicle wheel.

31. The wheel chocking device of claim 27, wherein said sensor is operatively associated with said drive mechanism such that said drive mechanism is deactivated when said sensor senses that said screw member have moved from the first position to the second position.

32. A method of securing a vehicle at a desired location using a wheel chocking device having a chock movable between a lowered position and a raised position and having a support link moveable relative to the chock between a non-supporting position and a supporting position, said method comprising the steps of:
positioning the vehicle at the desired location with the chock in the lowered position and the support link in the non-supporting position;

raising the chock to the raised position while the support link stays -in the non-supporting position; and moving the support link from the non-supporting position to the supporting position while the chock is in the raised position to thereby support the chock in the raised position.

33. The method of claim 32, wherein said moving step includes pivoting the support link.

34. The method of claim 32, wherein the chock stays in a substantially fully raised position during said moving step.

* * * * *